United States Patent Office 2,816,676
Patented Dec. 17, 1957

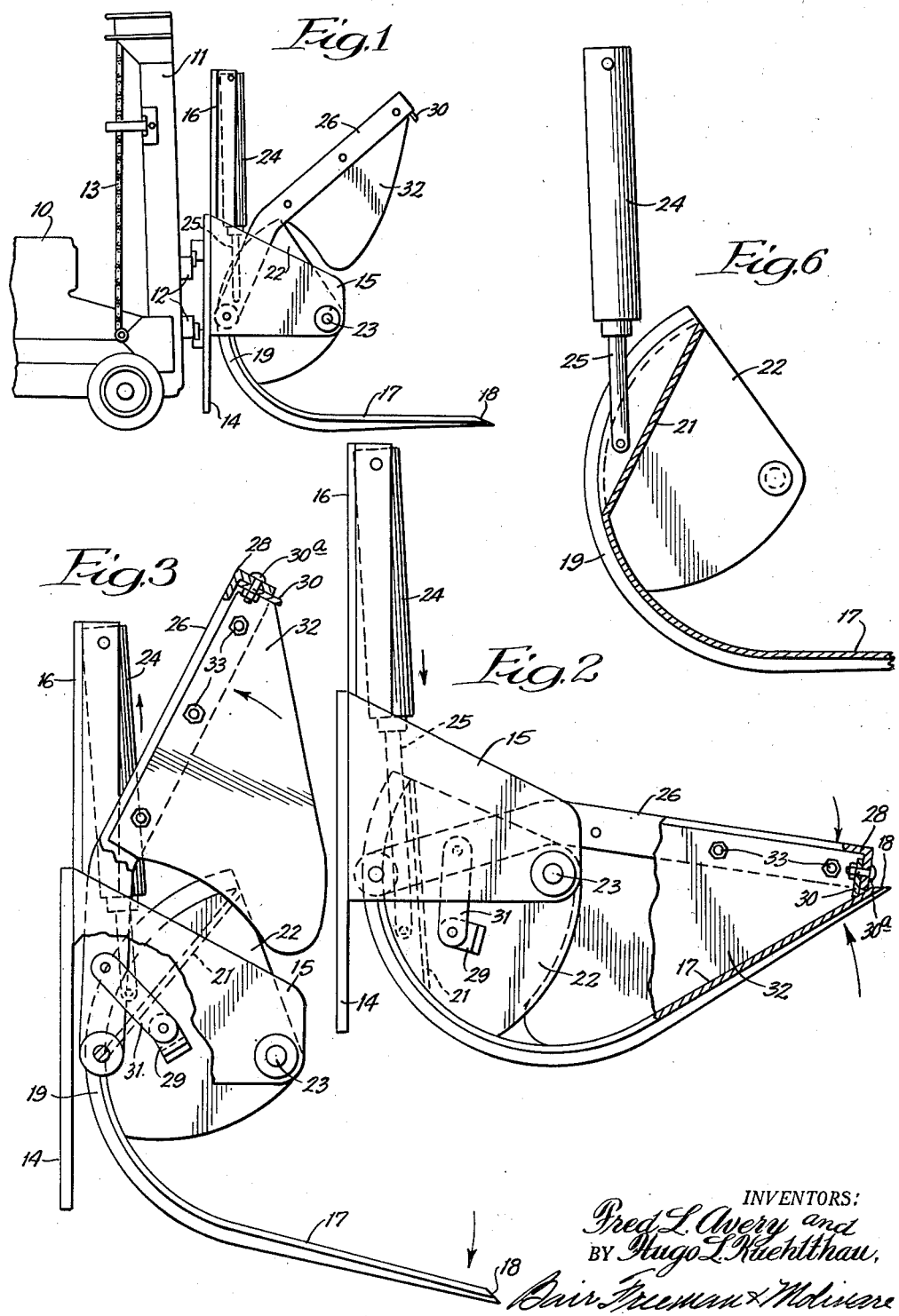

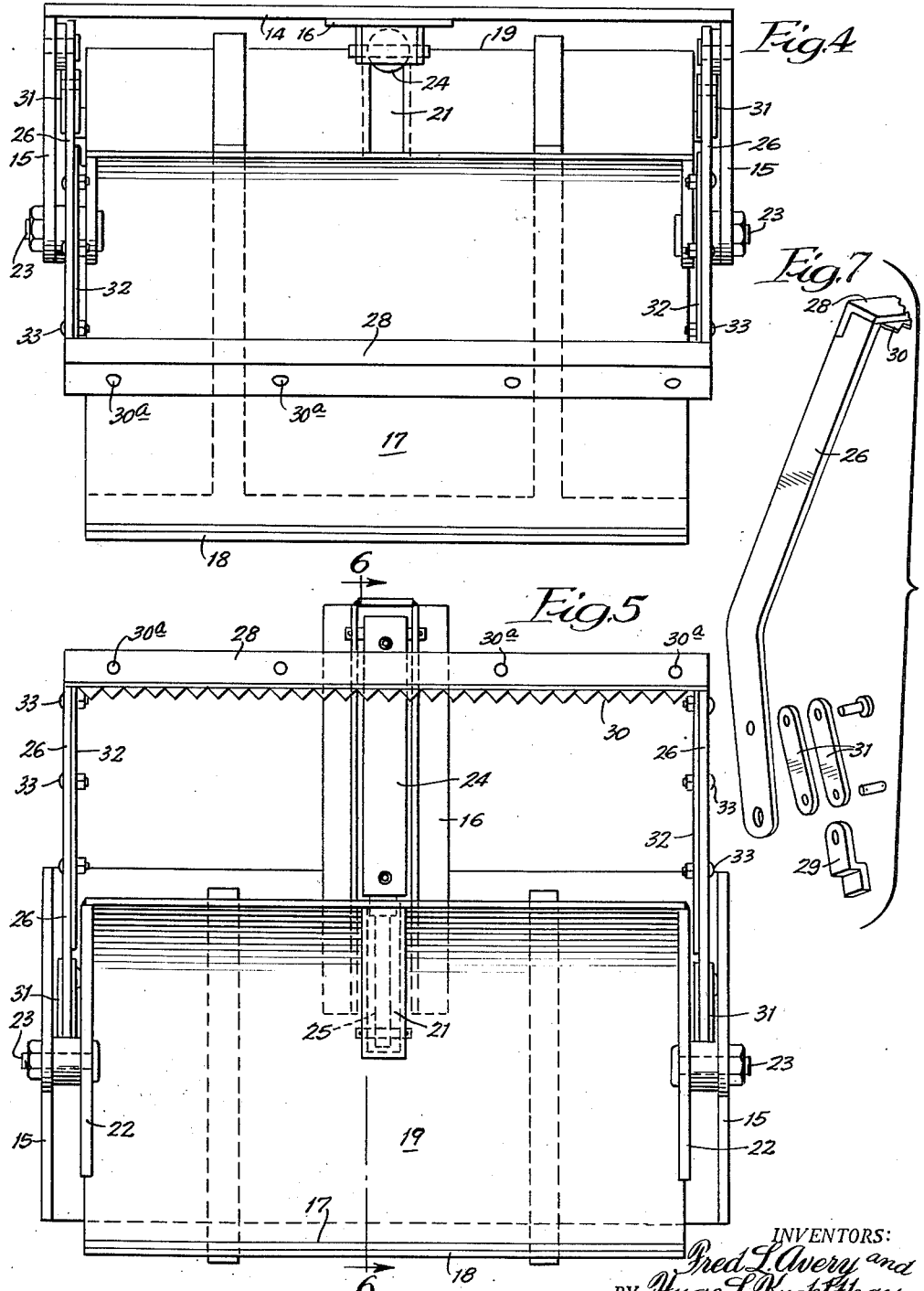

2,816,676
SCOOP UNIT

Fred J. Avery, La Grange, and Hugo L. Kuehlthau, Chicago, Ill.

Application August 1, 1955, Serial No. 525,671

10 Claims. (Cl. 214—701)

This invention relates to scoop units and more particularly to units for attachment to lift trucks, tractors, and the like, for handling loose material.

Many types of stringy materials, such as leather scraps, metal turnings, and the like, are difficult to handle with conventional scoops whether with solid bottoms or forked bottoms because the stringy material tends to mat and pull off of the scoop when it is moved to pick up a load from a pile. It is further very difficult to force a conventional scoop into a pile or mass of stringy material because of the resistance created by the scoop sides. Other materials, such as fertilizer and light powdered or granulated materials, which tend to cake are also difficult to handle because of the difficulty of getting a full load on the scoop and maintaining it thereon during transporting.

It is one of the objects of the present invention to provide a scoop unit with which loose stringy or caked materials are easily handled and with which a full load is easily obtained on the scoop and retained thereon during transporting.

Another object is to provide a scoop unit in which a holding bar is movable toward and away from the loading edge of the scoop to cut or break off excessive material hanging over the edge and to hold a full load of material on the scoop.

According to one feature of the invention, the holding bar is relatively narrow and may have a serrated edge to grip material firmly and hold the loaded material on the scoop.

A further object is to provide a scoop which is without side plates to be forced into a pile of material easily and in which the material is held on the scoop by separate side plates carried by a movable holding member.

A still further object is to provide a scoop unit in which the scoop shell is pivotally mounted and the holding member is connected to the scoop shell by linkage to be movable toward the loading edge of the scoop shell as it is tilted from a loading to a carrying position.

According to one desirable feature of the invention, the scoop shell may be tilted by an expansible fluid motor and may be connected to the holding member so that the holding bar will be moved away from the scoop shell when it is tilted to loading position and will be moved toward the loading edge of the scoop shell when it is tilted to carrying position.

The above and other objects and features of the invention will be more readily apparent from the following description when read in connection with the accompanying drawings, in which:

Figure 1 is a side elevation showing a portion of a lift truck equipped with a scoop unit embodying the invention;

Figure 2 is a side elevation of the scoop unit with the scoop in carrying position;

Figure 3 is a side elevation of the scoop unit with the scoop in unloading position;

Figure 4 is a top plan view showing the scoop in loading position;

Figure 5 is a front elevation showing the scoop in loading position;

Figure 6 is a section on the line 6—6 of Figure 5 with the supporting frame omitted; and Figure 7 is a partial perspective view illustrating the linkage connections between the scoop and the holding member.

In Figure 1, the scoop is illustrated as attached to a conventional industrial lift truck indicated generally at 10 which is provided at its forward end with an upright frame 11 to carry different types of tools. The frame 11 includes vertically movable supporting members 12 to which different types of units may be attached and which can be moved vertically on the frame through a chain 13 or the like.

The scoop unit of the present invention comprises a supporting framework including a mounting plate 14 adapted to be attached to the supporting members 12 to be raised and lowered thereby. The plate 14 has forwardly extending side brackets 15 on which the scoop shell is adapted to be mounted. At its central part, the frame carries upwardly extending channel member 16 on which the operating motor for the scoop may be mounted.

A scoop shell is pivotally mounted between the side brackets 15 and as shown comprises a generally flat bottom 17 terminating at its outer end in a loading edge 18. At the rear part of the scoop shell the bottom curves upwardly to define a curved back 19 for the scoop to assist in holding loaded material thereon. As best seen in Figures 5 and 6, the back of the scoop shell is grooved forwardly, as indicated at 21, to define an open channel in the back of the scoop shell for attachment of the operating motor thereto. For mounting the scoop shell it is provided with side plates 22 attached to the back 19 and connected through pivots 23 to the side brackets 15 on the supporting plate. It will be noted that the pivots 23 lie horizontally between the back of the scoop and the loading edge thereof so that the scoop can turn from a loading position to a carrying position or to an unloading position, as desired.

Tilting movement of the scoop is controlled through an expansible fluid motor 24 having a piston rod 25 extending into the open groove defined by the recess 21 and pivotally connected to the scoop shell adjacent to the back thereof. Supply of fluid to the motor can be controlled through conventional valving on the truck or tractor itself so that the scoop can be tilted to any desired position. When the motor is expanded, as shown in Figure 2, the forward end of the scoop will be tilted upwardly to a carrying position in which material on the scoop tends to be retained thereon. When the motor is fully contracted, as shown in Figure 3, the forward end of the scoop will be tilted downwardly so that material thereon can easily be unloaded from the front edge. With the motor partially expanded, as shown in Figure 1, the bottom 17 of the scoop will lie in a substantially horizontal position in which the material to be loaded can easily be picked up.

To cut off excess material from the front or loading edge of the scoop and to hold a full load of material on the scoop, holding means are provided. The holding means, as shown, comprises a pair of side arms 26 pivoted on the side brackets 15 at 27 adjacent to the back of the scoop. The arms 26 may be slightly bent, as shown, and are of a length to extend substantially to the loading edge 18 of the scoop when the scoop and holding means are held together. At their forward ends, the arms 26 carry a relatively narrow cross bar 28 which may be in the form of an L-beam for stiffness.

To assist in gripping stringy material which is difficult to pull from a pile and to assist in breaking off hard caked material the cross bar 28 may carry a serrated or roughened holding strip as shown at 30. This strip may be in the form of a relatively thin strip of steel or the like detachably fastened to the cross bar 28 by fastenings such as bolts 30a with its edge projecting beyond the lower edge of the cross bar and serrated or toothed as shown. When stringy material is being handled, the relatively narrow toothed edge of the bar 30 will grip the material securely and may assist in breaking or cutting off excess material so that the scoop will be fully and properly loaded. The toothed strip will normally not be necessary in handling caked, granular or powdered material although it may assist in some cases in breaking the large cakes of such material so that the scoop can be loaded properly. In addition, where the strip is used the wear will be confined almost entirely to the strip which can easily be replaced when it wears out or becomes so dull as to be ineffective.

To move the holding means, the sides 22 of the scoop have brackets 29 rigidly attached thereto at points between the back of the scoop and the pivots 23. Links 31 connect the brackets 29 to points on the arms 26 intermediate the ends thereof.

In order to hold loose material from falling off of the sides of the scoop without requiring permanent side plates on the scoop which would interfere with loading thereof, the arms 26 may carry detachable side plates 32 which are secured to the arms by fastenings such as bolts 33. The side plates are shaped as shown in Figures 2 and 3 so that when the holding member is raised the side plates will be well above the bottom of the scoop and will not interfere with loading thereof. When the holding member is moved down to carrying position as shown in Figure 2, the side plates will overlap the side edges of the scoop bottom and will slightly overlap the short side plates 22 by which the scoop is mounted to hold material on the scoop.

In handling stringy material such as trimmings, turnings or the like, the side plates are preferably omitted since such material does not tend to fall from the sides of the scoop during carrying. In handling powdered or granular material, however, the side plates are preferably employed to hold the material on the scoop. In either case during loading, the side plates are elevated so that the sides of the scoop bottom are unobstructed and the scoop can be forced easily into a pile or mass of the material to be loaded. When the side plates are employed they will tend to break off any material extending beyond the sides of the scoop and when in the carrying position will close the sides of the scoop to hold the loaded material thereon.

In operation, with the scoop in its loading position, as shown in Figure 1, the links 31 swing the arms 26 upward so that they lie well above the scoop bottom and will not interfere with the loading of material on the scoop. In this condition, the truck may be driven toward a pile of material to be loaded to force the loading edge 18 into or under the pile until a desired full load of material is on the scoop.

In the case of stringy material the side plates 32 are omitted since they are not necessary. The forward end of the scoop, being unobstructed can be forced under the material relatively easily to be fully loaded. With caked or granular material the side plates are used but the scoop is still unobstructed at the sides for easy loading.

When the scoop is fully loaded, the motor 24 is expanded to rock the scoop counter-clockwise to the carrying position shown in Figure 2. At the same time, the links 31 will pull the arms 26 downward to bring the cross bar 28 into engagement with the scoop bottom at the loading edge thereof, as shown in Figure 2. Stringy material on the scoop will be gripped by the bar 28 or the serrated strip 30 to be pulled from the pile so that a full load will be obtained. Caked powder or granular material overhanging the loading edge at this time will be cut off or broken off by the bar 28 and the material on the scoop will be held thereon by the bar. As the holding bar moves toward the scoop the side plates 32 will move over the sides of the scoop and will overlap the short side plates 22 on the scoop to break off excess material at the sides of the scoop and to prevent loss of the load over the sides of the scoop. The scoop can then be raised through the elevating mechanism on the truck and can be transported to any desired unloading point.

For unloading, the motor 24 is fully contracted to the position shown in Figure 3. During contraction of the motor, the scoop will be swung back clockwise about the pivots 23 and at the same time the links 31 will raise the arms 26 and bar 28 away from the scoop so that the material can be discharged easily and freely therefrom.

While one embodiment of the invention has been shown and described herein, it will be understood that it is illustrative only and not to be taken as a definition of the scope of the invention, reference being had for this purpose to the appended claims.

What is claimed is:

1. A scoop unit comprising supporting means adapted to be mounted on a truck or the like, a scoop pivotally mounted on the supporting means on a horizontal axis and having a bottom to receive and hold material to be handled, means to move the scoop about its pivotal mounting from a loading position to an upwardly tilted carrying position, a holding member pivoted on the supporting means on a horizontal axis spaced from the first named axis and including a bar movable toward and away from the scoop bottom, and a link pivotally connected at its ends to the holding member and the scoop on axes spaced from the pivotal axes of the scoop and holding member to move the bar toward the scoop bottom simultaneously as the scoop is tilted toward its carrying position.

2. The construction of claim 1 in which the means to move the scoop comprises an expansible fluid motor connected at one end to the supporting means and at its other end to the scoop at a point between the supporting means and the pivotal mounting of the scoop.

3. A scoop unit comprising supporting means adapted to be mounted on a truck or the like, a scoop pivotally mounted on the supporting means on a horizontal axis and having a generally flat bottom extending forward from the line of the pivotal axis to terminate in a loading edge and a back extending upward from the bottom to the rear of the pivotal axis, means to tilt the scoop about its pivotal mounting from a loading position with the bottom horizontal to a carrying position with the bottom tilted upward, a holding member pivoted on the supporting means on a horizontal axis spaced from the first named axis and including a horizontal bar movable toward and away from the loading edge, and a link pivotally connected at its ends to the scoop and the holding member on axes spaced from the pivotal axes of the scoop and holding member to move the bar toward the loading edge simultaneously as the scoop is tilted toward its carrying position.

4. A scoop unit comprising supporting means adapted to be mounted on a truck or the like, a scoop including a bottom terminating at one end in a loading edge and at its other end in an upwardly extending back, means mounting the scoop on the supporting means for pivotal movement about an axis vertically above the bottom and horizontally between the loading edge and the back for movement from a loading position with the bottom horizontal to a carrying position with the bottom tilted upward, means to tilt the scoop about its pivotal axis, a holding member pivoted at one end on the supporting means on a horizontal axis spaced from the pivotal axis of the scoop and terminating at its other end in a bar movable toward and away from the loading edge of the scoop, and a link pivotally connected at its ends respectively to the holding means intermediate its ends and to the scoop between its pivotal axis and its back to move the bar toward the loading edge of the scoop simultaneously as the scoop is tilted toward its carrying position.

5. The construction of claim 4 in which the means to tilt the scoop comprises a generally vertical expansible fluid motor connected at its upper end to the supporting means above the scoop and at its lower end to the back of the scoop.

6. A scoop unit comprising a supporting plate to be mounted on a lift truck or the like, brackets extending forward from the sides of the plate, a scoop having a flat bottom terminating at its forward end in a loading edge and an upwardly extending back lying adjacent to the plate, side plates on the scoop pivotally connected to the brackets on a horizontal axis between the loading edge and the back, means connected to the scoop to swing it about its pivotal axis from a loading position with its bottom horizontal to a carrying position with its bottom tilted upward at the front, a holding member pivoted at one end on the supporting plate and terminating at its other end in a bar movable toward and away from the loading edge of the scoop, and a pair of links lying outside of the scoop side plates and pivotally connected at one end to the scoop side plates between the back and the pivotal axis and at their other ends to the holding member intermediate its ends.

7. A scoop unit comprising supporting means adapted to be mounted on a truck or the like, a scoop having a generally flat bottom terminating at one end in a loading edge, means mounting the scoop on the supporting means with the flat bottom lying substantially horizontal, the sides of the scoop bottom being unobstructed adjacent to the loading edge whereby it can be pushed easily into a pile of material to be loaded, holding means including a pair of side arms pivoted at one end on the supporting means adjacent to the sides of the scoop, power means to move the side arms from a raised position spaced from the scoop bottom to a lowered position with the free ends thereof adjacent to the loading edge of the scoop bottom, and side plates secured to the side arms to be spaced from the scoop bottom when the side arms are in raised position and to lie closely adjacent to the sides of the scoop bottom when the side arms are in lowered position.

8. A scoop unit comprising supporting means adapted to be mounted on a truck or the like, a scoop having a generally flat bottom terminating at one end in a loading edge, means mounting the scoop on the supporting means, the sides of the scoop bottom being unobstructed adjacent to the loading edge whereby it can be pushed easily into a pile of material to be loaded, holding means including a pair of side arms pivoted at one end on the supporting means adjacent to the sides of the scoop, power means to move the side arms from a raised position spaced from the scoop bottom to a lowered position with the free ends thereof adjacent to the loading edge of the scoop bottom, side plates secured to the side arms to be spaced from the scoop bottom when the side arms are in raised position and to lie closely adjacent to the sides of the scoop bottom when the side arms are in lowered position, and a cross bar connecting the free ends of the side arms to engage the scoop bottom near its loading edge when the side arms are in lowered position.

9. A scoop unit comprising supporting means adapted to be mounted on a truck or the like, a scoop having a generally flat bottom terminating at one end in a loading edge and being unobstructed at its sides adjacent to the loading edge, means pivotally mounting the scoop on the supporting means for tilting about a horizontal axis from a loading position with the bottom substantially horizontal to a carrying position with the loading edge tilted upward, means to tilt the scoop from its loading to its carrying position, holding means including a pair of side arms pivoted at one end to the supporting means adjacent to the sides of the scoop, links connecting the side arms to the scoop to move the side arms from a raised position spaced from the scoop when it is in its loading position to a lowered position with their free ends adjacent to the loading edge when the scoop is in its carrying position, and side plates secured to the side arms to be spaced from the scoop when the arms are raised and to lie adjacent to the scoop sides when the arms are lowered.

10. A scoop unit comprising supporting means adapted to be mounted on a truck or the like, a scoop having a generally flat bottom terminating at one end in a loading edge and being unobstructed at its sides adjacent to the loading edge, means pivotally mounting the scoop on the supporting means for tilting about a horizontal axis from a loading position with the bottom substantially horizontal to a carrying position with the loading edge tilted upward, means to tilt the scoop from its loading to its carrying position, holding means including a pair of side arms pivoted at one end to the supporting means adjacent to the sides of the scoop, links connecting the side arms to the scoop to move the side arms from a raised position spaced from the scoop when it is in its loading position to a lowered position with their free ends adjacent to the loading edge when the scoop is in its carrying position, side plates secured to the side arms to be spaced from the scoop when the arms are raised and to lie adjacent to the scoop sides when the arms are lowered, and a cross bar connecting the free ends of the side arms to engage the scoop bottom near its loading edge when the side arms are lowered.

References Cited in the file of this patent

UNITED STATES PATENTS

| | | |
|---|---|---|
| 2,225,787 | McDermott et al. | Dec. 24, 1940 |
| 2,455,474 | Drott et al. | Dec. 7, 1948 |
| 2,501,243 | Snyder | Mar. 21, 1950 |
| 2,626,722 | Talbott | Jan. 27, 1953 |
| 2,679,330 | Allen | May 25, 1954 |
| 2,717,704 | Pilch | Sept. 13, 1955 |